Jan. 10, 1967    H. H. KOPPEL ET AL    3,296,868
DIFFERENTIAL PRESSURE TRANSMITTER
Filed July 22, 1963    2 Sheets-Sheet 1

INVENTORS
HAROLD H. KOPPEL
AND JOHN V. WERME
BY
ATTORNEY

INVENTORS
HAROLD H. KOPPEL
AND JOHN V. WERME
BY
*John F. Luhrs*
ATTORNEY

| United States Patent Office | 3,296,868
| --- | --- |
| | Patented Jan. 10, 1967 |

3,296,868
DIFFERENTIAL PRESSURE TRANSMITTER
Harold H. Koppel, Cleveland, and John V. Werme, Painesville, Ohio, assignors to Bailey Meter Company, a corporation of Delaware
Filed July 22, 1963, Ser. No. 296,713
3 Claims. (Cl. 73—407)

This invention relates to a differential pressure transmitter of the type that develops an output signal proportional to a cycling differential pressure.

Although this transmitter is adaptable to measure any differential pressure it was primarily developed for use in flow measurement applications. As such, the description will proceed and be primarily directed toward flow measurement.

One common method of measuring the flow rate of a fluid in a closed conduit is to position a restriction in the conduit and measure the pressure differential across this restriction. Apparatus is generally provided for producing a signal proportional to the measured pressure differential to provide a manifestation of flow rate. The signal thus produced may be utilized to effect control of the fluid flow or to provide an indication of the flow rate. Our transmitter is of the type which can be employed in such a system.

Prior to our invention, transmitters used in these systems often introduced errors as a result of ambient temperature change. Regardless of the principle of operation of the transmitter, be it motion balance, force balance, motion detection, or any other, such errors are present and result in system inaccuracies. In our transmitter the effects of such change have been eliminated.

The transmitter herein described operates on what can be considered a motion-detection principle. An electrical pick-up such as a movable core transformer detects the motion developed by a periodically reversing differential pressure. This transformer generates an output signal which is proportional to the deflection developed by the differential pressure and is also periodically reversing. By measuring only the peak-to-peak values of this bi-directional output signal, errors due to ambient temperature change are eliminated. Ambient temperature changes usually affect the absolute value of the signal which our transmitter does not measure and is therefore unaffected. Of course, the volts per inch sensitivity of the motion detector must be constant over the displacement to produce a linear output.

Another source of trouble and error in transmitters actuated from a differential pressure is hysteresis. When uninterrupted uni-directional forces are used the inherent hysteresis of the device prevents a return to zero or starting position with a resultant system error. Although hysteresis prevents a return to the zero position it does not affect the range of travel. Given any force the range remains constant and is independent of hysteresis. One reason given for the hysteresis error at zero or null is the small forces existing at these positions, they are not sufficient to overcome the internal and external frictional forces and an error results. This, of course, is true only in systems operating under a balance of forces. In a continually moving system such balance never exists and the adverse hysteresis error is not apparent. Our system continually cycles around a null position which the measuring circuit does not detect and is therefore free of hysteresis error.

In the past differential pressure transmitters required considerable correction to eliminate the adverse affects due to ambient temperature change and hysteresis. At best these corrective measures only partially corrected the errors introduced, and consequently the system accuracy suffered. Accordingly, it is an object of this invention to provide a differential pressure transmitter that requires no correction for ambient temperature change.

It is also an object of this invention to provide a differential pressure transmitter that continually oscillates and thereby does not require correction for hysteresis errors.

Another object of our invention is to provide a differential pressure transmitter that operates from a cycling differential pressure.

In one embodiment of our invention a quick change valve reverses the direction of the differential pressure to the transmitter housing at a pre-set frequency. The housing has three chambers divided as such by two identical diaphragms. Two of the three chambers are arranged to receive the cycling differential pressure as produced by the quick change valve. In the third chamber a movable core is positioned by the two diaphragms and moved in accordance therewith. This core is further positioned to move through a transformer having a primary winding and a pair of differentially wound secondary windings. As the differential pressure changes direction the direction of the core movement is reversed. The cyclic displacement of the core from the null position will be proportional to the magnitude of the differential pressure. Operating in this manner, the output signal from the transformer secondary is proportional to the differential pressure. The polarity of this signal changes at the same frequency as that of the applied differential pressure. This output voltage is then measured by an electric circuit sensitive to peak values of voltage.

Various other objects and advantages will appear from the following description of one embodiment of the invention and the novel features will be particularly pointed out hereinafter in connection with the appended claims.

Figure 1:
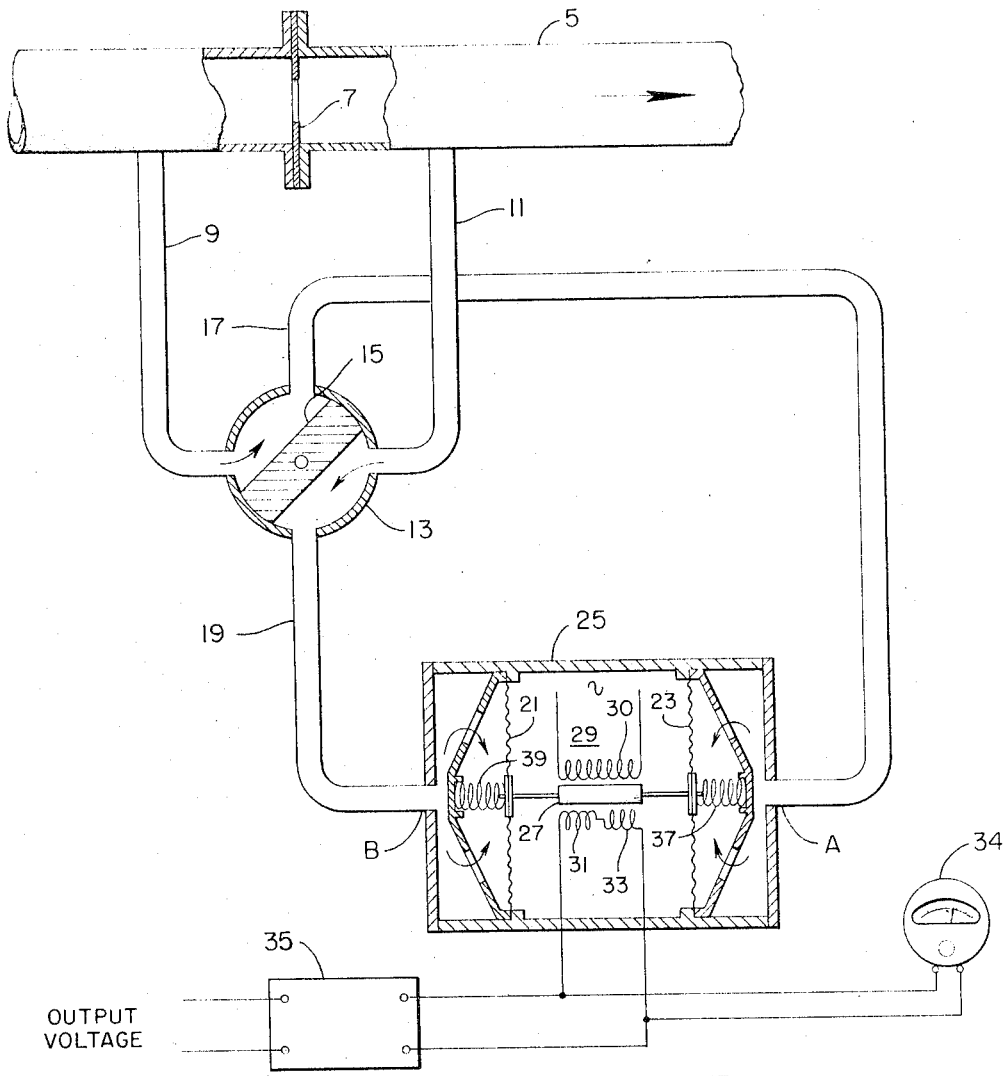
FIG. 1 is a schematic diagram of one preferred embodiment of our invention.

Referring now to FIG. 1 therein is shown a conduit 5 containing a fluid flowing in the direction indicated by the arrow. A pressure differential is established by placing an orifice 7 in the conduit at right angles to the axis of the conduit. Two connecting pipes 9 and 11 are inserted in the conduit on either side of an orifice to sense the pressure differential established thereby. The pressure differential is transmitted through connecting pipes 9 and 11 to opposite sides of a quick-change valve 13. Thus, the pressure differential enters the quick-change valve body on opposite sides of a rotary valve member 15. With the rotary valve member 15 in the position shown, the high pressure passes through the quick-change valve 13 and into a connecting pipe 17. The lower pressure also passes through the quick-change valve 13 and into a connecting pipe 19. As viewed from the upper connecting pipe 17 to the lower connecting pipe 19 the established pressure differential is positive. By rotating the rotary valve member 15 to a position 90° from that shown the differential pressure polarity will be reversed. Now the differential pressure as viewed from the upper connecting pipe 17 to the lower connecting pipe 19 will be negative. It should be apparent that rotation of the rotary valve member 15 reverses the polarity of the differential pressure as viewed from the upper connecting pipe 17 to the lower connecting pipe 19. What we have generated with our quick-change valve 13 is a cycling differential pressure. To vary the frequency of the pressure reversal it is only necessary to increase or decrease the rotating speed of the rotary valve member 15.

The differential pressure established in the upper and lower connecting pipes 17 and 19 is impressed across a pair of diaphragms 21 and 23 positioned in a transmitter housing 25. These diaphragms flex in accordance with the direction and proportional to the magnitude of the differential pressure. Mounted between these diaphragms and positioned therewith is a soft iron core 27. The extent and direction of the core 27 movement is then directly related to the differential pressure. That is a positive differential pressure between ports A and B causes a deflection toward port B. Conversely a negative differential pressure results in a deflection toward port A. It is evident that the core 27 deflection reverses as the differential pressure reverses.

Also mounted with the space between the diaphragms is a transformer 29 having a primary winding 30 and a pair of serially connected differentially wound secondary windings 31 and 33. The transformer 29 and soft iron core 27 are arranged so that movement of the core changes the transformer coupling. This combination of soft iron core and transformer is commonly known to those skilled in the art as a movable core transformer. Movable core transformers as such are well known and no further description is deemed necessary. Suffice is to say the voltage developed across the secondary windings will be related to the diaphragm deflection and its phase will depend on the direction of the applied differential pressure. If the pressure is positive from port A to port B the phase angle of the output voltage will be 180° reversed when the pressure is negative from port A to port B.

Figure 2:
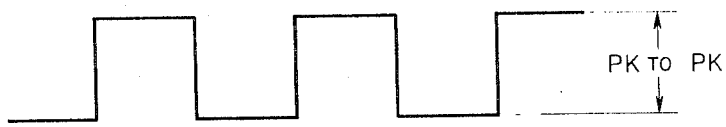
FIG. 2 shows a representation of the square-wave output of the demodulator connected to our transmitter.

The pulsating voltage generated by the movable core transformer 29, proportional to the differential pressure, may be measured by any suitable means such as meter 34, or by means of a pulse shaping device such as shown at 35, or square-wave signal may be produced as shown in FIG. 2 having a magnitude proportional to the differential pressure and a frequency corresponding to the speed of rotation of valve member 15. Circuitry of the type sensitive only to peak values of voltage would be used to measure this signal.

Normally the travel of a soft iron core in a movable core transformer is limited due to non-linearities. Primarily this is a result of non-linearities in the transformer output if the core travels more than small increments from its neutral position. In order to assure a core travel well within the linear range of the transformer a pair of range springs 37 and 39 is employed. Adjustment of these springs serves to produce a predetermined travel of the soft iron core over the range in differential pressures produced by the orifice 7, with the maximum travel of the soft iron core 27 occurring at the maximum expected differential pressure.

Our description has proceeded along the lines of a movable core transformer detector. Various other detectors could also be used. To name only a few of the many that could equally as well have been described there are strain gauge pick ups, variable capacitance and piezo electric elements. None of these alternatives have been described because their substitution is obvious.

Figure 3A:
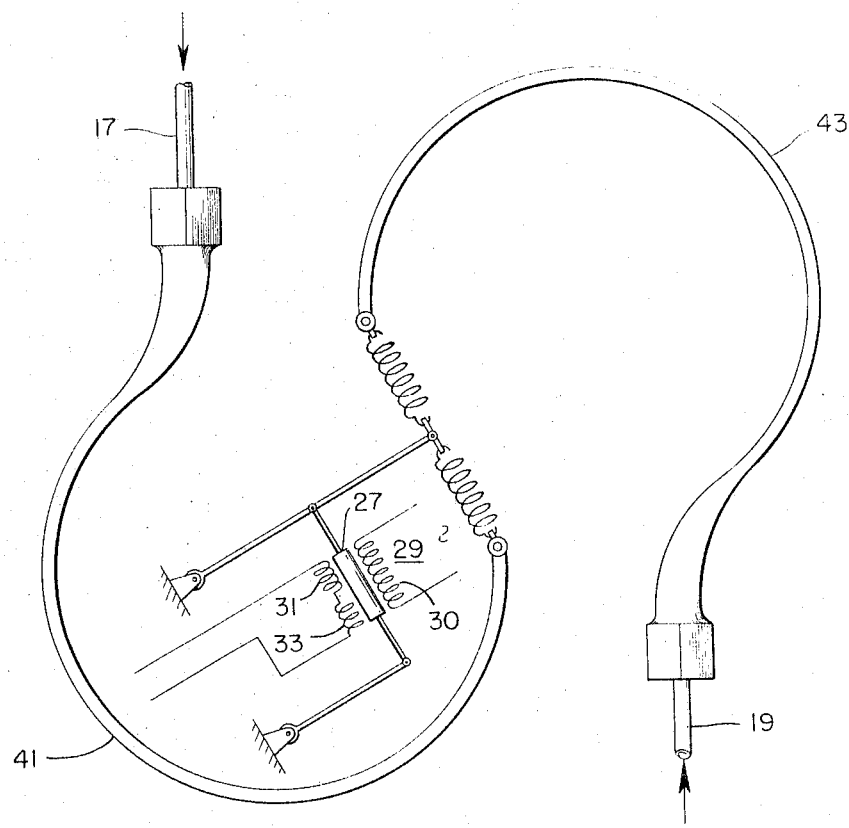
FIG. 3A is a schematic representation of an alternate embodiment of our invention.

Various other devices could also replace the diaphragms 21 and 23 as herein before described. FIG. 3A shows opposed Bourdon tubes 41 and 43 connected to receive the cycling differential pressure as generated in the upper and lower connecting pipes 17 and 19. In this embodiment the soft iron core 27 would be reciprocated by the deflection of the tubes. As the differential pressure changed in direction so would the movement of the soft iron core.

Figure 3B:
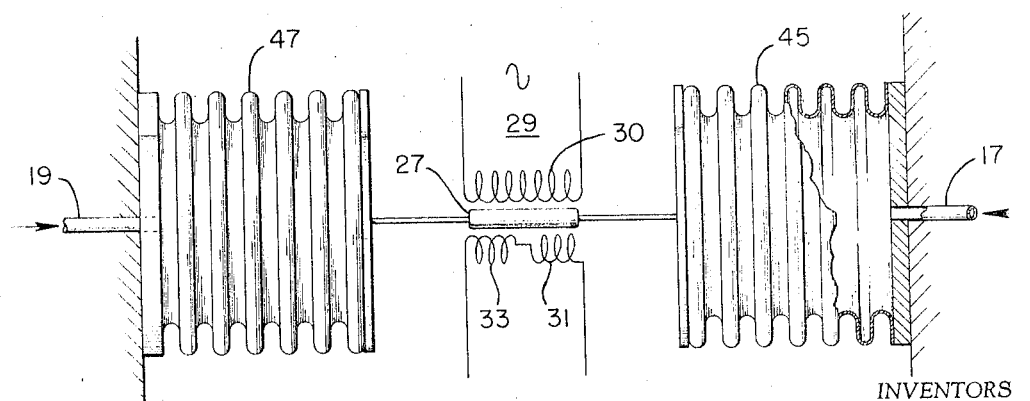
FIG. 3B is a schematic representative of another form of our invention.

Another embodiment of our invention is shown in FIG. 3B. Here opposing expansible bellows 45 and 47 are connected to receive the cycling differential pressure from the connecting pipes 17 and 19. Again the direction and magnitude of deflection of the interconnecting soft iron core 27 depends on the direction and magnitude of the differential pressure.

What we claim as new and wish to protect by Letters Patent of the United States is:

1. A differential pressure transmitter, comprising, a housing, a diaphragm means internally mounted in said housing and positioned to flex axially therein in response to changes in the difference in pressures applied to the opposite sides thereof, means connected to said diaphragm means to sense the axial flexing thereof, a pressure transmitting connection into said housing on one side of said diaphragm means connected to a first source of fluid pressure, a pressure transmitting connection into said housing on the opposite side of said diaphragm means connected to a second source of fluid pressure, and means for cyclically reversing said connections for predetermined increments of time so that the first source of fluid pressure is cyclically applied to the one side and then the opposite side of said diaphragm means for predetermined equal increments of time while said second source of fluid pressure is cyclically applied to the opposite side and then the one side of said diaphragm means.

2. A differential pressure transmitter, comprising, a motion detector cabable of detecting either a positive or negative movement; a Bourdon tube connected to one end of said motion detector; a second Bourdon tube connected to the opposite end of said motion detector, means connected to each of said Bourdon tubes to provide communication between said tubes and different pressures to thereby produce a displacement of said motion detector proportional to the difference in said pressures; and means for cyclically causing each of said Bourdon tubes to respond to one and then the other of the pressures.

3. A differential pressure transmitter, comprising, a motion detector capable of sensing movement in either a positive or negative direction; a bellows connected to one end of said motion detector; a second bellows connected to the opposite end of said motion detector, each of said bellows connected to a separate source of pressure to thereby produce a displacement of said motion detector corresponding to the difference in said pressures; and means for cyclically reversing the connections between said bellows and said pressure sources for predetermined equal increments of time.

References Cited by the Examiner

UNITED STATES PATENTS

| | | | |
|---|---|---|---|
| 2,619,076 | 11/1952 | Agin | 91—275 X |
| 2,627,183 | 2/1953 | Greenwood et al. | 73—410 X |
| 2,735,405 | 2/1956 | Hipple | 91—275 |
| 2,989,084 | 6/1961 | Jones. | |
| 3,054,295 | 9/1962 | Burner | 73—407 X |
| 3,153,935 | 10/1964 | Karlson | 73—398 |
| 3,161,059 | 12/1964 | Burggren | 73—398 |
| 3,162,795 | 12/1964 | Cherniak | 73—407 X |

LOUIS R. PRINCE, *Primary Examiner.*

DONALD O. WOODIEL, *Assistant Examiner.*